United States Patent
Matsunaga et al.

(10) Patent No.: US 10,873,777 B2
(45) Date of Patent: Dec. 22, 2020

(54) INFORMATION PROCESSING DEVICE AND INFORMATION PROCESSING METHOD TO CALCULATE SCORE FOR EVALUATION OF ACTION

(71) Applicant: SONY CORPORATION, Tokyo (JP)

(72) Inventors: Hideyuki Matsunaga, Kanagawa (JP); Sho Murakoshi, Tokyo (JP); Katsuji Miyazawa, Tokyo (JP); Yoshihiro Nakanishi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 40 days.

(21) Appl. No.: 15/528,568

(22) PCT Filed: Sep. 25, 2015

(86) PCT No.: PCT/JP2015/077129
§ 371 (c)(1),
(2) Date: May 22, 2017

(87) PCT Pub. No.: WO2016/098415
PCT Pub. Date: Jun. 23, 2016

(65) Prior Publication Data
US 2017/0280182 A1    Sep. 28, 2017

(30) Foreign Application Priority Data

Dec. 18, 2014  (JP) .................... 2014-255984

(51) Int. Cl.
| | |
|---|---|
| H04N 21/2665 | (2011.01) |
| H04N 5/91 | (2006.01) |
| H04N 21/8549 | (2011.01) |
| H04N 5/93 | (2006.01) |
| H04N 21/25 | (2011.01) |
| H04N 21/234 | (2011.01) |

(Continued)

(52) U.S. Cl.
CPC ......... H04N 21/2665 (2013.01); H04N 5/77 (2013.01); H04N 5/91 (2013.01); H04N 5/93 (2013.01); H04N 9/8205 (2013.01); H04N 21/2187 (2013.01); H04N 21/23418 (2013.01); H04N 21/252 (2013.01); H04N 21/25891 (2013.01); H04N 21/2668 (2013.01); H04N 21/4826 (2013.01); H04N 21/4882 (2013.01); H04N 21/8549 (2013.01)

(58) Field of Classification Search
None
See application file for complete search history.

(56) References Cited

U.S. PATENT DOCUMENTS

| | | | | |
|---|---|---|---|---|
| 9,262,481 | B1 * | 2/2016 | Le | G06Q 50/01 |
| 2008/0222671 | A1 * | 9/2008 | Lee | G06Q 30/02 |
| | | | | 725/10 |
| 2009/0262137 | A1 * | 10/2009 | Walker | H04H 60/04 |
| | | | | 345/629 |

FOREIGN PATENT DOCUMENTS

| | | | |
|---|---|---|---|
| JP | 2002-259720 A | 9/2002 | |
| JP | 2002-300518 A | 10/2002 | |

(Continued)

*Primary Examiner* — James R Marandi
(74) *Attorney, Agent, or Firm* — Chip Law Group (57) ABSTRACT

Provided is an information processing device that includes a variate acquisition unit that acquires a first variate related to a content of action, and a second variate related to context in which the action is taken and a score calculation unit that calculates a score for evaluating the action on a basis of the first variate and the second variate.

13 Claims, 7 Drawing Sheets

(51) Int. Cl.
*H04N 21/2187* (2011.01)
*H04N 5/77* (2006.01)
*H04N 21/482* (2011.01)
*H04N 9/82* (2006.01)
*H04N 21/488* (2011.01)
*H04N 21/258* (2011.01)
*H04N 21/2668* (2011.01)

(56) References Cited

FOREIGN PATENT DOCUMENTS

| | | |
|---|---|---|
| JP | 2003-333500 A | 11/2003 |
| JP | 2005-251018 A | 9/2005 |
| JP | 2010-266880 A | 11/2010 |
| JP | 2013-258450 A | 12/2013 |

\* cited by examiner

INFORMATION PROCESSING DEVICE AND INFORMATION PROCESSING METHOD TO CALCULATE SCORE FOR EVALUATION OF ACTION

CROSS REFERENCE TO RELATED APPLICATIONS

This application is a U.S. National Phase of International Patent Application No. PCT/JP2015/077129 filed on Sep. 25, 2015, which claims priority benefit of Japanese Patent Application No. JP 2014-255984 filed in the Japan Patent Office on Dec. 18, 2014. Each of the above-referenced applications is hereby incorporated herein by reference in its entirety.

TECHNICAL FIELD

The present disclosure relates to information processing devices, information processing methods, and programs.

BACKGROUND ART

For example, when a user views content capturing some action such as a video of sports, it is convenient for the user to selectively view only important parts of the content to reduce viewing time. For example, Patent Literature 1 describes a technology for automatically extracting exciting parts of TV broadcasting desired by a viewer on the basis of audio signals, integrating the extracted parts, and playing back the integrated parts.

CITATION LIST

Patent Literature

Patent Literature 1: JP 2010-266880A

DISCLOSURE OF INVENTION

Technical Problem

However, for example, according to the technology described in Patent Literature 1, the exciting parts are determined on the basis of voice of an audience with regard to the action. In other words, a part of content is not always extracted on the basis of a result of evaluation of the action itself. Therefore, sometimes an improper part may be extracted in a case where the audience emits their voice, which is triggered by a factor other than the action (such as a play in sports). Alternatively, it is difficult to determine the exciting part in a case of no audience or action that has not been taken, because it is impossible to acquire the voice of the audience.

Accordingly, the present disclosure proposes a novel and improved information processing device, information processing method, and program that are capable of evaluating action itself on the basis of a variate related to the action.

Solution to Problem

According to the present disclosure, there is provided an information processing device including: a variate acquisition unit configured to acquire a first variate related to a content of action, and a second variate related to context in which the action is taken; and a score calculation unit configured to calculate a score for evaluating the action on a basis of the first variate and the second variate.

In addition, according to the present disclosure, there is provided an information processing method including: acquiring a first variate related to a content of action, and a second variate related to context in which the action is taken; and calculating, by a processor, a score for evaluating the action on a basis of the first variate and the second variate.

In addition, according to the present disclosure, there is provided a program for causing a computer to achieve: a function of acquiring a first variate related to a content of action, and a second variate related to context in which the action is taken; and a function of calculating a score for evaluating the action on a basis of the first variate and the second variate.

Advantageous Effects of Invention

As described above, according to the present disclosure, it is possible to evaluate action itself on the basis of a variate related to the action.

Note that the effects described above are not necessarily limitative. With or in the place of the above effects, there may be achieved any one of the effects described in this specification or other effects that may be grasped from this specification.

MODE(S) FOR CARRYING OUT THE INVENTION

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Figure 1:
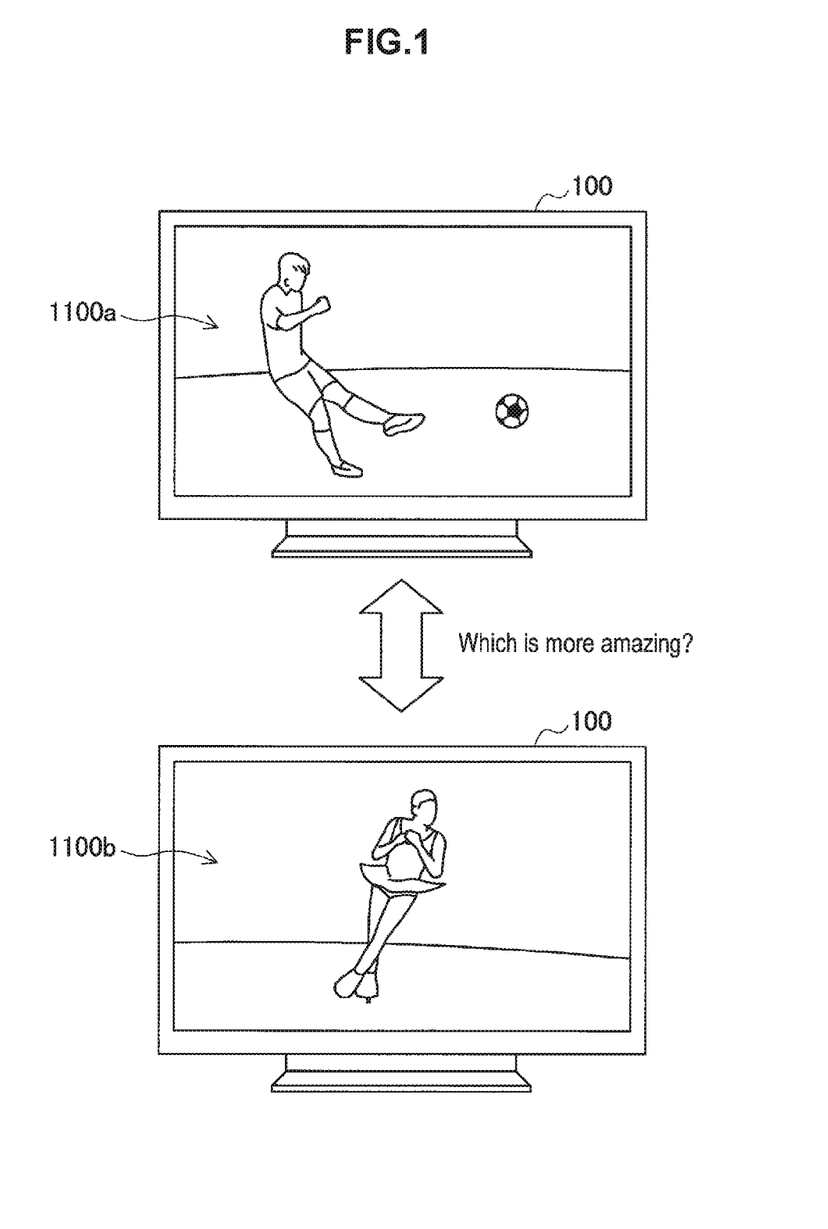
FIG. 1 is a diagram schematically illustrating an embodiment of the present disclosure.

The description is given in the following order.
1. System configuration
2. Place of score calculation process
3. Score calculation process 4. Example of calculated score
5. Application example
6. Hardware configuration
7. Supplement FIG. 1 is a diagram schematically illustrating an embodiment of the present disclosure. With reference to FIG. 1, a soccer video 1100a and a figure skating video 1100b are on televisions 100. Nowadays, it is very popular to view videos of sports provided through broadcasting or video delivery as illustrated in FIG. 1. An amazing play or performance captured in the video of sports often moves users.

For example, it is assumed that video content is recommended to a user in the example illustrated in FIG. 1. For example, it is easy to recommend the content in a case where sports that the user is interested in are clearly different from sports that the user is not interested in. More specifically, in a case where it has been found that a user is interested in soccer but is not interested in figure skating, it is easy to recommend the video 1100a rather than the video 1100b as content to be viewed by the user.

On the other hand, it is difficult to recommend content in a case where a user is interested many sports equally, or in a case where the user wants to see a sport that the user is not interested in usually if the sport include an amazing play or performance. In addition, for example, it is difficult to determine which is more amazing, a play in a soccer game captured in the video 1100a or performance in figure skating captured in the video 1100b.

According to the embodiment, scores for evaluating action are calculated on the basis of first variates and second variates in the above described situation. The first variate is related to a content of the action (such as a play or performance in sport), and the second variate is related to context in which the action is taken. Thereby, it is possible to determine which is more amazing, the play captured in the video 1100a or the performance captured in the video 1100b in the example illustrated in FIG. 1.

(1. System Configuration)

Figure 2:
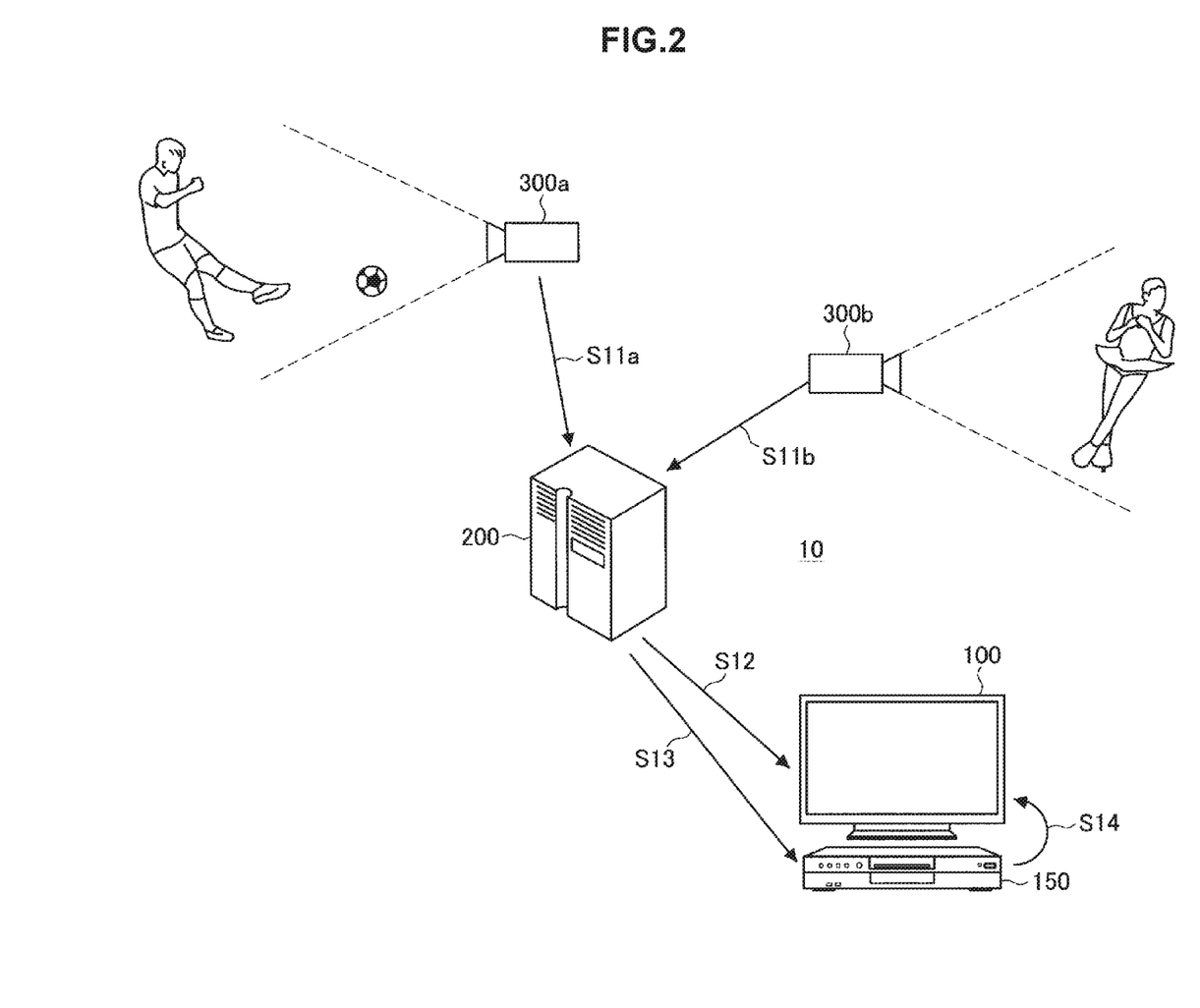
FIG. 2 is a diagram illustrating a configuration example of a system according to an embodiment of the present disclosure.

FIG. 2 is a diagram illustrating a configuration example of a system according to an embodiment of the present disclosure. With reference to FIG. 2, a system 10 includes the television 100, a recorder 150, a server 200, and cameras 300.

The television 100 and the recorder 150 are examples of a terminal device configured to provide a video delivered from the server 200 to a user. For example, the video is transmitted from the server 200 to the television 100 through broadcast waves (S12). Alternatively, the video may be delivered from the server 200 to the television 100 via the Internet. Alternatively, the video may be transmitted from the server 200 to the recorder 150 through broadcast waves (S13). Alternatively, the video may be delivered from the server 200 to the recorder 150 via the Internet. The user may view the video delivered or transmitted to the television 100 in real time, or may view the video by playing back the video recorded in the recorder 150 using the television 100 (S14).

The example of the terminal device is not limited to the case where both the television 100 and the recorder 150 are installed. For example, the recorder does not have to be installed in a case where the video is mainly viewed in real time. In addition, it is also possible to view a video in real time or view a video by playing back the recorded video using a personal computer, tablet, or smartphone instead of the television. For example, such a terminal device may be implemented by a hardware configuration of an information processing device (to be described later).

The server 200 delivers the video provided by the cameras 300 to the television 100 and/or the recorder 150. More specifically, the server 200 delivers the video to the television 00 and the recorder 150 through transmission using the broadcast waves or delivery via the Internet, for example. On the other hand, in the illustrated example, the two cameras 300a and 300b provide videos to the server 200 (S11a and S11b). The server 200 may select one of the videos and deliver it to the television 100 and/or the recorder 150, for example. Alternatively, the server 200 may deliver the both videos to the television 100 and/or the recorder 150. For example, the server 200 is implemented by a single server device or a plurality of server devices that cooperatively operate with each other in a network. For example, each of the server devices is implemented by a hardware configuration of the information processing device (to be described later).

The cameras 300 provide videos to the server 200. In the illustrated example, the cameras 300 include two cameras 300a and 300b. The respective cameras 300a and 300b capture videos of plays or performance in different kinds of sports. More specifically, the camera 300a captures video of plays in a soccer game, and the camera 300b captures video of performance in figure skating. The cameras 300 may capture the videos in parallel or at different times, for example. In addition, the cameras 300 provide the videos to the server (S11a and S11b) while capturing the videos or after capturing the videos. For example, the cameras 300 may be digital video cameras. However, the videos do not have to be digital data in the embodiment. For example, the cameras 300 may include an analog video camera. In addition to the video capturing function, the camera 300 may have a communication function, input function, and computing function, for example. In this case, the camera 300 is implemented by a hardware configuration of the information processing device (to be described later).

As described above, according to the embodiment, it is possible to calculate scores of plays and performance in sports. For example, the scores are calculated in the server 200. In this case, the server 200 may determine which video provided in parallel by the camera 300a and the camera 300b is delivered to the television 100 and/or the recorder 150 (S12 and S13), on the basis of the scores. In addition, the server 200 may determine length and the order of the respective videos on the basis of the scores in order to edit the videos provided by one or both of the cameras 300a and 300b and create a video (such as digest video) to be delivered to the television 100 and/or the recorder 150. Alternatively, in a case where only one of the cameras 300a and 300b provides a video or in a case where the video to be delivered has been specified by a user (in other words, in a case where it is not necessary to determine which video to deliver), the server 200 may deliver a score to the television 100 and/or the recorder 150 as metadata in addition to the video.

Alternatively, scores may be calculated in the television 100 or the recorder 150. In this case, for example, the television 100 may determine whether or not to recommend a user to view a video delivered from the server 200, on the basis of a score. In addition, the recorder 150 may determine priority levels of recording and playing back (S14) of videos delivered from the server 200, on the basis of scores. Such determination may be made in accordance with scores calculated in the television 100 or the recorder 150, or in accordance with scores delivered from the server 200 as metadata. In addition, the television 100 and the recorder 150 may cooperatively operate with each other and determine to cause a user to view one of a plurality of videos delivered from the server 200 (such as respective videos provided by the camera 300a and the camera 300b) on the television 100 and record the other videos in the recorder 150 in accordance with the scores.

Alternatively, scores may be calculated in the cameras 300. In this case, for example, the cameras 300a and 300b may determine whether or not to provide respective videos captured by the cameras 300a and 300b to the server 200, on the basis the scores.

(2. Place of Score Calculation Process)

Figure 3:
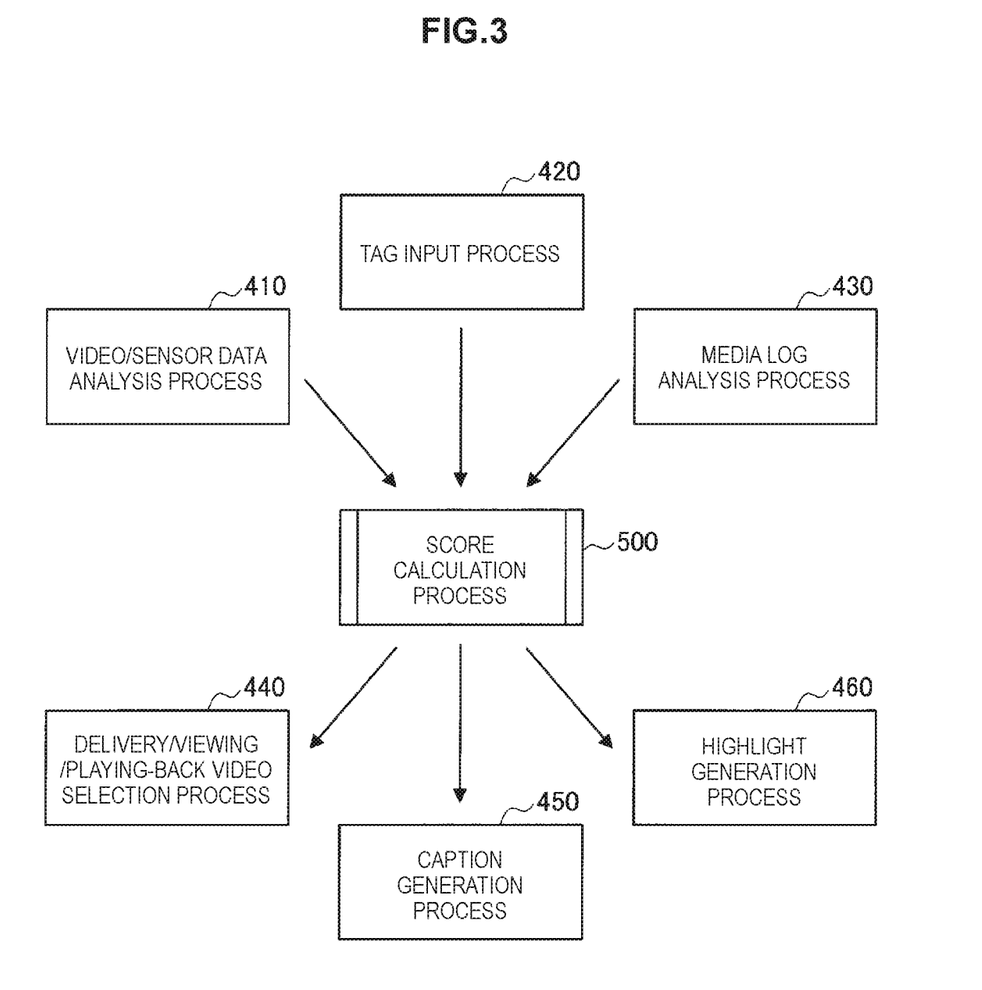
FIG. 3 is a diagram illustrating a place of a score calculation process according to an embodiment of the present disclosure.

FIG. 3 is a diagram illustrating a place of a score calculation process according to an embodiment of the present disclosure. FIG. 3 illustrates an image/sensor data analysis process 410, a tag input process 420, and a media log analysis process 430, as a previous stage of a score calculation process 500. In addition, FIG. 3 illustrates a delivery/viewing/playing-back video selection process 440, a caption generation process 450, and a highlight generation process 460, as a next stage of the score calculation process 500. Hereinafter, details of the processes in the previous stage and the next stage will be described for ease of comprehension of significance of scores calculated in the embodiment.

(Processes in Previous Stage)

For example, the video/sensor data analysis process 410 is a process for analyzing videos captured by the cameras 300 or sensor data detected by a sensor worn by a sport player (actor who takes action) or a sensor attached to equipment. For example, by analyzing a video, it is possible to detect a subject in the video, and a position, posture, movement, and the like of the subject. In addition, it is also possible to detect impact on a player/equipment or posture or movement of the player/equipment by analyzing sensor data of an acceleration sensor, an angular velocity sensor, or the like. In the video/sensor data analysis process 410, it is possible to acquire a variate related to a content of action (play or performance in sport) captured as a video by analyzing such a video or sensor data, for example. The video and sensor data are analyzed by a processor such as a central processing unit (CPU) equipped in the information processing device that implements the television 100, the recorder 150, the server 200, or the camera 300, for example.

For example, the tag input process 420 is a process in which a person capturing a video by using the camera 300 or an observer of the server 200 inputs a tag with regard to a play or performance in the sport captured by the camera 300. The tag is input via an input device equipped in the information processing device that implements the camera 300 or the server 200, for example. For example, the tag may be input in association with a specific timestamp of a captured video. In this case, the tag may indicate a content or a result of each action (play or performance in sports). Alternatively, the tag may be input in association with the whole unit of a captured video. In this case, the tag may indicate a variate with regard to context in which an action (play or performance) is taken such as a place or a result of a match or a competition. In another example, tag may be (for example, automatically) input in accordance with progress of a match. In this case, the tag may also indicate a variate related to context in which an action is taken such as remaining time of the match.

The media log analysis process 430 is a process for analyzing a media log related to a play or a performance (action) in a sport captured by the camera 300. Although the video/sensor data analysis process 410 and the tag input process 420 can be executed in parallel with occurrence of an action, the media log analysis process 430 is often executed after occurrence of the action. For example, the media log analysis process 430 includes a process for collecting comments or contents related to a play or performance by performing text mining on posts on social media or news articles, and a process for aggregating length of time periods in which a play or performance is featured on television/radio broadcasting. Such a process does not always indicate variates related to a content of action or context in which the action is taken. However, as described later, such a process is performed to acquire a coefficient for calculating a score of the action from such variates.

(Processes in Next Stage)

The delivery/viewing/playing-back video selection process 440 is a process for determining a video to be delivered from the server 200 to the television 100 or the recorder 150, or a video to be viewed on the television 100, or a video to be played back by the recorder 150 and output from the television 100, on the basis of scores calculated in the score calculation process 500, for example. The delivery/viewing/playing-back video selection process 440 may be executed in a case where there are a plurality of selectable videos, such as a case where the camera 300a and the camera 300b concurrently provide videos to the server 200, a case where the server 200 concurrently delivers two or more videos to the television 100, or a case where two or more videos are recorded in the recorder 150.

The caption generation process 450 is a process for generating a caption based on a score. The caption is inserted into a video to be output to the television 100. The caption may be generated in the server 200, and delivered to the television 100 or the recorder 150 in addition to the video. Alternatively, the caption may be generated in the television 100 or the recorder 150 on the basis of metadata delivered from the server 200 in addition to the video.

The highlight generation process 460 is a process for generating a highlight video by combining parts of a video captured by the camera 300. For example, the highlight video may be generated by extracting parts whose scores exceed a threshold from a video provided by the camera 300. Here, the highlight video may be generated from a single video, or from a plurality of videos. The plurality of videos may be videos capturing a same sport match or competition from different angles, or may be videos capturing different sports matches or competitions. For example, the highlight video may be generated in the server 200, or may be generated in the television 100 or the recorder 150 by using a video delivered from the server 200.

(3. Score Calculation Process)

Figure 4:
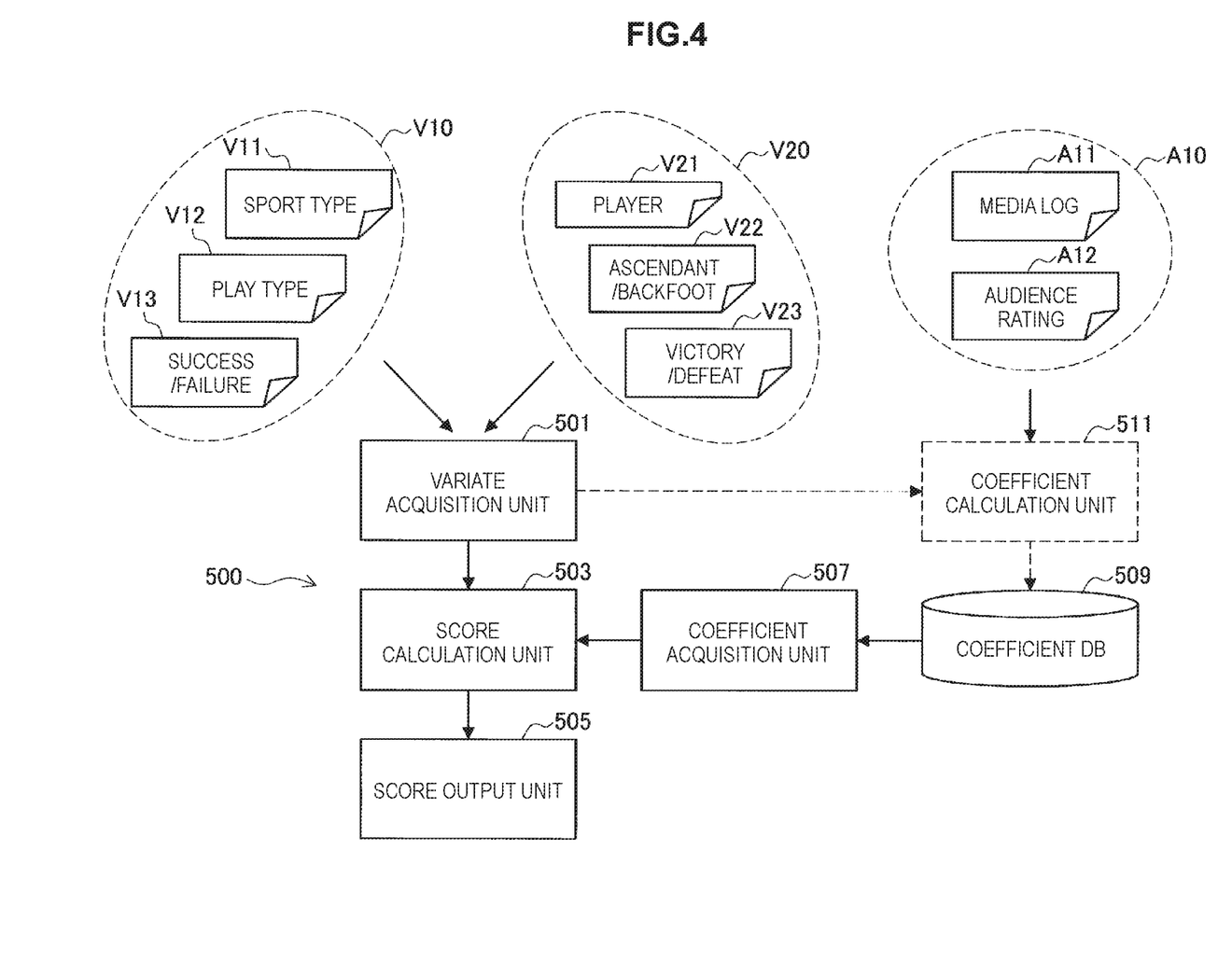
FIG. 4 is a diagram illustrating structural elements of a score calculation process according to an embodiment of the present disclosure.

FIG. 4 is a diagram illustrating structural elements of the score calculation process according to an embodiment of the present disclosure. FIG. 4 illustrates a variate acquisition unit 501, a score calculation unit 503, a score output unit 505, and a coefficient acquisition unit 507 as the structural elements of the score calculation process 500. FIG. 4 further illustrates a coefficient DB 509 and a coefficient calculation unit 511 as additional structural elements. For example, the variate acquisition unit 501, the score calculation unit 503, the score output unit 505, the coefficient acquisition unit 507, and the coefficient calculation unit 511 may be implemented by a processor in a device configured to execute the score calculation process 500 (for example, server 200, television 100, recorder 150, or camera 300), the processor operating in accordance with a program. For example, the coefficient DB 509 may be implemented by a memory or a storage in the above described device.

The variate acquisition unit 501 acquires a variate V10 and a variate V20. The variate V10 is related to a content of action (play or performance in sports). The variate V10 includes sport type V11, play type V12, success/failure V13, for example. According to the embodiment, the variate V10 may include a vector obtained by combining values. More specifically, the variate V10 may be a three-dimensional vector in a case where the sport type V11 represents a classification value by sport type (for example, baseball=1, figure skating=2, soccer=3, . . . ), the play type V12 represents a classification value by play type defined in each sport (for example, strikeout=0, base on balls=1, single=2, double=3, triple=4, home run=5, . . . in a case of offense in baseball), and the success/failure V13 is binary including 0 and 1. In addition, the variate V 10 related to the content of action may include physical quantities such as ball speed in baseball or rotation speed in figure skating.

On the other hand, the variate V20 is related to context in which an action (play or performance in sports) is taken. The variate V20 includes a player V21, ascendant/backfoot V22, victory/defeat V23, and the like, for example. In a way similar to the variate V10, the variate V20 may include a vector obtained by combining values. More specifically, the player V21 is a variate related to an actor who has taken action. For example, the player V21 may be a classification value of each player, or may be a classification value by rank of players defined in each sport (for example, seed in tournament, starter/substitute players in team sports, or batting order in baseball).

The ascendant/backfoot V22 is a variate related to progress of a match until an action is taken in the match. For example, the ascendant/backfoot V22 may be a value determined on the basis of whether a score calculation target player or a score calculation target team is ascendant or on the back foot when an action (play or performance) is taken in a sport in which a team or player with the most points at the end of a game wins. For example, the ascendant/backfoot V22 may be determined in a binary way on the basis of whether or not the team or player has got more points than the other team or player, or may be determined using gradual values in accordance with the number of points behind/ahead of the other team. For example, the ascendant/backfoot V22 may be estimated on the basis of a result obtained by the video/sensor data analysis process 410 even in a case where scores are not calculated in a sport other than the sports in which a team or player with the most points at the end of a game wins, or a sport in which scores are calculated after a match or performance finishes.

The victory/defeat V23 is a value indicating a result of a match derived from occurrence of action (play or performance), more specifically, victory or defeat of a score calculation target player or a score calculation target team. In a way similar to the ascendant/backfoot V22, the victory/defeat V23 may be determined in a binary way, or may be determined using gradual values in accordance with the number of points (whether the player/team has won a close race or won by a wide margin). For example, it is possible to predict the victory/defeat V23 that is obtained in a case where points are changed by success in various kinds of plays for each play to be expected in sports in which point change is defined by a rule (for example, one point for a success shot in a soccer match, three points for home run with two runners on base in a baseball match, five points for a success try in a rugby match, and the like). Alternatively, in a case of sports in which a player performs a program such as figure skating, it is possible to predict the victory/defeat V23 depending on success/failure in each element.

For example, the variate acquisition unit 501 acquires the variate V10 through the video/sensor data analysis process 410 and the tag input process 420. In addition, the variate acquisition unit 501 acquires the variate V20 through the tag input process 420, for example. For example, in a case where the video/sensor data analysis process 410 and the tag input process 420 are executed by a device same as a device that executes the score calculation process 500, the variate acquisition unit 510 is implemented by a processor internally executing a program for acquiring the variates V10 and V20. Alternatively, in a case where the video/sensor data analysis process 410 and the tag input process 420 are executed by devices different from the device that executes the score calculation process 500, the variate acquisition unit 510 may be a software interface such as a driver configured to receive the variates V10 and V20 from such devices via a communication device.

The score calculation unit 503 calculates a score of action (play or performance in sports) on the basis of the variates V10 and V20 acquired by the variate acquisition unit 501. For example, the calculated score may be a score obtained by evaluating amazingness of the action, more specifically, how much the action has moved an audience (for example, users viewing a video). As described above, score calculation target action in the embodiment is a play or performance in sports. However, a unit of the action may vary. For example, the score may be calculated for a set of plays or performance that are commonly recognized such as a match or a competition. Alternatively, for example, the score may be calculated for each small unit of plays or performance such as each pass or shot in a soccer match, each pitching in a baseball match, or each jump or spin in figure skating. Alternatively, for example, the score may be calculated for an intermediate unit between the above described large unit and small unit, such as a series of movement of a ball until shooting in a soccer match, an inning in a baseball match, or performance of each player in figure skating.

Here, score calculation target action includes a plurality of types of sports. The score calculation unit 503 may calculate a score that is common to the plurality of types of sports. At this time, the score calculation unit 503 may correct the score in accordance with popularity of each type of sports. More specifically, for example, the score calculation unit 503 may adjust the score upward with respect to a sport with low popularity. The score may be adjusted upward in accordance with an equation 1 listed below by using a score before the adjustment (Score') and popularity P of the type of a sport (0<P≤1), for example. Thereby, a score of the sport with low popularity P is adjusted upward in comparison with a score of a sport with higher popularity P. The popularity P is estimated on the basis of player numbers, the number of times that related words have been searched, length of television broadcasting time of related content.

[Math. 1]

$$\text{Score} = \frac{\text{Score}'}{P} \qquad \text{(Equation 1)}$$

In addition, the score calculation unit 503 may calculate a score for each attribute of players (actors who take action) or users (users of content related to action). For example, the score calculation unit 503 may calculate a score for each player in a match or a competition constituted by plays or performance of a plurality of players. Alternatively, instead of each player, a score may be calculated by attribute common to a plurality of players such as a nationality, a team, or an age group. In a similar way, the score calculation unit 503 may calculate a score personalized to each user in accordance with the user's preference. Alternatively, the score calculation unit 503 may calculate a score by attribute common to a plurality of users such as a nationality, sex, or an age group. As an example of combining the above described methods, the score calculation unit 503 may adjust a score upward in a case where the nationality of a player is the same as the nationality of a user (for example, cheering for the user's national team in the Olympic games) or in a case where the age of the player is similar to the age of the user (for example, cheering for the player of similar age).

The score output unit 505 outputs the score calculated by the score calculation unit 503. For example, in a case where the delivery/viewing/playing-back video selection process 440, the caption generation process 450, and/or the highlight generation process 460 are executed by a device same as the score calculation process 500, the score output unit 505 is implemented by a processor executing a program for internally providing the score to these processing units by the score calculation unit 503. Alternatively, in a case where these processes are executed by devices different from the device that executes the score calculation process 500, the score output unit 505 may be a software interface such as a driver configured to transmit a score to these devices via a communication device.

The coefficient acquisition unit 507 acquires, from the coefficient DB 509, a coefficient for the score calculation unit 503 to calculate a score on the basis of the variates V10 and V20. For example, the coefficient may be calculated by the coefficient calculation unit 511 (to be described later) in advance and stored in the coefficient DB 509. Alternatively, the coefficient may be separately calculated or determined, and read by the coefficient DB 509. An example of the calculation of a score by using a coefficient is represented by an equation 2 listed below, where $V_1$ represents a vector of the variate V10, $V_2$ represents a vector of the variate V20, and $W_1$ and $W_2$ respectively represent vectors of corresponding coefficients.

[Math. 2]

$$\text{Score} = V_1 \cdot W_1 + V_2 \cdot W_2 \quad \text{(Equation 2)}$$

For example, if the coefficients $W_1$ and $W_2$ are a matrix in the equation 2, a score may be calculated as a vector. For example, in a case where a score is calculated by attribute of players or users as described above, the matrix of the coefficients $W_1$ and $W_2$ may be set such that elements of a vector of a score correspond to a score of each attribute. In a case where the variates V10 and V20 include a vector as a member, a vector ($W_3$) of a coefficient may be separately allocated to the vector of V10 and V20 (for example, the vector is added to the equation 2 as $V_3$).

The coefficient calculation unit 511 calculates the coefficients on the basis of a relation among the variates V10 and V20 related to the action acquired by the variate acquisition unit 504, and audience response A10 to the action. More specifically, the coefficient calculation unit 511 collects the variates V10 and V20 and the audience response A10 with regard to past action, performs machine learning on the basis of the variates and the audience response, and specifies the coefficients indicating the relation among the variates V10, V20, and the response A10. As the machine learning, various known methods such as a linear regression model or a non-linear regression model can be used.

Here, the audience response A10 may be represented as a degree of stimulation of media, for example. In the illustrated example, the audience response A10 includes a media log A11 and audience rating A12. Such indexes may be acquired through the above described media log analysis process 430, for example. Therefore, the audience response A10 may further include length of time periods in which a play or performance is featured on television/radio broadcasting. According to the embodiment, the degree of stimulation of media represented by such indexes is used as indexes of amazingness of action represented by the score calculated by the score calculation unit 503. More specifically, the degree of stimulation of media is used as indexes of how much the action moves a user.

(Score Prediction)

Through the above described score calculation process 500, it is possible to predict a score of action (play or performance in sports) that has not been taken yet. More specifically, in this case, the variate acquisition unit 501 acquires the variate V10 related to content of action that is not finished for each of development patterns of the action that are predicted at the time, and the score calculation unit 503 calculates the score for each of the development patterns. More specifically, for example, in a case of offense in baseball, the predicted development patterns of the action are basically limited to strikeout, base on balls, error, single, double, triple, and home run. If a runner(s) is/are on base, it is possible to predict a point that will be acquired in each of the development patterns. Alternatively, for example, in a case of offense in soccer, predicted development patterns of action include a shot (succeeded), a shot (failed), stolen ball, and the like. The score calculation unit 503 calculates a score for each of the patterns. This enables prediction of variation of the score in accordance with development of a play or a game in real time.

In addition, the score calculation unit 503 may calculates an expected value of a score at that time on the basis of probability of occurrence of each of the development patterns. The probability of occurrence may be statistically calculated such as batting average of each baseball player, or a soccer shot success rate at each position in a pitch. Alternatively, when predicting a score, the score calculation unit 503 may adopt a highest score as a predicted value among scores calculated for the respective development patterns having reasonable probability of occurrence. Thereby, for example, it is possible to prevent missing an impressive scene (action that have a high score as a result) in a case of selecting a video to be viewed or delivered in real time in accordance with the prediction of the score. The reasonable probability of occurrence may be appropriately determined on the basis of types of sports or preference of users, for example. The reasonable probability of occurrence may be at least probability that a user thinks it supposedly happens, or probability that is not dramatically low.

(4. Example of Calculated Score)

Figure 5:
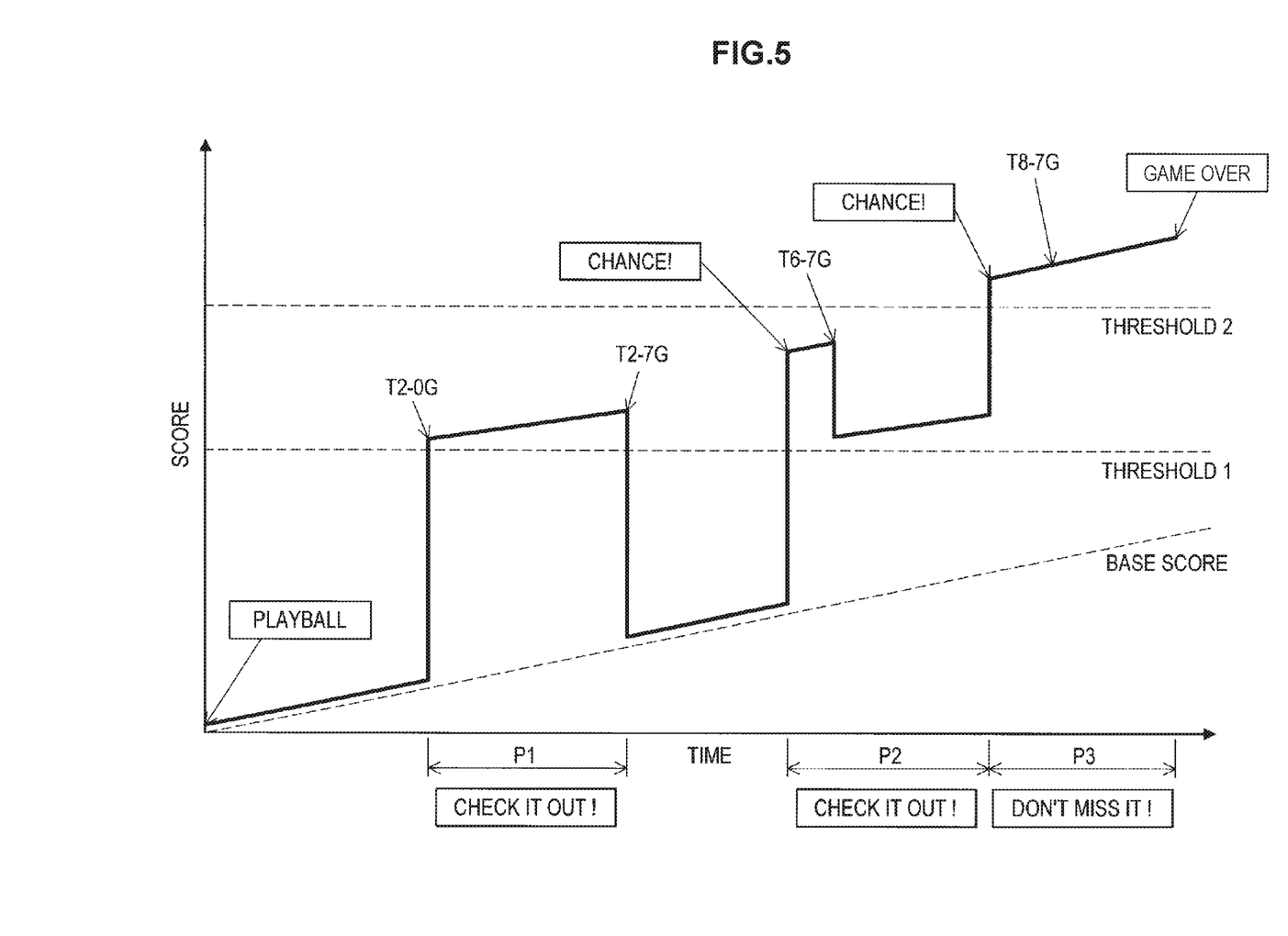
FIG. 5 is a graph illustrating an example of scores calculated according to an embodiment of the present disclosure.

FIG. 5 is a graph illustrating an example of scores calculated according to an embodiment of the present disclosure. FIG. 5 illustrates an example of scores in a baseball match (from PLAY BALL to GAME OVER) calculated by the score calculation unit 530. In the illustrated example, a base score is set. The base score is a score increasing with progress of a match (time or inning). The base score indicates that a weight of each play increases toward the end of a baseball match or soccer match, for example. In the above described example, elapsed time or innings in the match may be included in the variate V20 related to context in which an action is taken. For example, the score calculation unit 503 calculates a base score by multiplying the elapsed time by a positive coefficient.

The illustrated example indicates a baseball match between a team T and a team G. The score calculation unit 503 calculates scores at the team T's side since the score calculation unit 503 knows that a user (viewer of video) is a fan of the team T. After PLAY BALL (after the match starts), the calculated scores substantially equal to the base score while the match is flat. When the team T takes a two-point lead (T2-0G), the score increases because the team T is predicted to win (victory/defeat V23) in accordance with the two-point lead, and the score exceeds a threshold 1. For example, the server 200 that has detected the increase in the score may transmit, to the television 100, information for outputting a notification "CHECK IT OUT!" to the user viewing another program on the television 100, during a subsequent period P.

Next, the score decreases when the team G gets seven points at a burst (T2-7G), turns the game around, and the team T is predicted to lose in reversal. At this time, the server 200 stops issuing the notification "CHECK IT OUT!" to the user. However, subsequently, the score increases again due to a situation in which a batter (player V21) with high batting average is facing a pitcher when the team T gets scoring opportunities, and the score exceeds the threshold 1, for example. During a subsequent period P2, the server 200 starts issuing the notification "CHECK IT OUT!" to the user again. Although the team T gets additional four points on this occasion, the team T does not turn the game around (T6-7G), and the score decreases once. However, the team T is down by only one point in contrast to previous innings, and the score is not as low as the score before "CHANCE!" (for example, a relatively high score is allocated in accordance with a gap in points even when the team is down on the basis of the ascendant/backfoot V22), and the score remains exceeding the threshold 1. Therefore, the server 200 continues issuing the notification "CHECK IT OUT!" to the user.

In addition, at the end of the match, the team T gets scoring opportunities again while the team T is down by one point. At this time, the base score is high because the match is reaching the end, and the score does not decrease (the score would rather increase at the end of the match) because the gap in the points is only one although the team T is down as described above. If the team T gets additional points, it is highly predicted that the tram T will win. Therefore, the score reaches the best ever and exceeds a threshold 2. For example, the server 200 that has detected the increase in the score may change the notification to the user to another expression that recommends the user to view the video more strongly such as "DON'T MISS IT!", during a subsequent period P3. In the illustrated example, the team T finally succeeds in turning the game around (T8-7G), and the match ends (GAME OVER) with the team T's victory.

After the score is calculated as described above, for example, a user A having more time views video of the match at the periods P1, P2, and P3 in accordance with the recommendation through the notifications, and grasps progress of the match (variation in score). Alternatively, for example, a user B having no time can view the video of the match at the period P3 in accordance with the strong recommendation through the notification, and does not miss the end of the come-from-behind victory.

As described above, the score calculation unit 503 calculates the score at the team T's side in the illustrated example. Therefore, for example, in a case where the user is a fan of the team G alternatively, the score calculation unit 503 may calculate a score that varies inversely with the illustrated example.

(5. Application Example)

Figure 6:
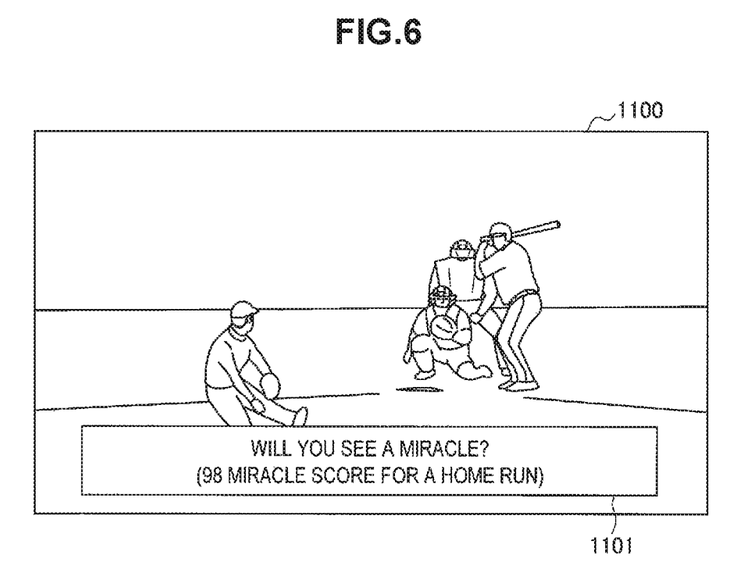
FIG. 6 is a diagram illustrating an example in which a calculated score is applied to a caption of a video according to an embodiment of the present disclosure.

FIG. 6 is a diagram illustrating an example in which a calculated score is applied to a caption of a video according to an embodiment of the present disclosure. In the illustrated example, a caption 1101 is displayed in a video 1100. In the illustrated example, the score calculated by the score calculation unit 503 is referred to as a "miracle score". This score is calculated such that a higher score is allocated to "rare and amazing action (play or performance)", for example. More specifically, the higher score is allocated in a case of come-from-behind victory with big gap in score, or in a case of achieving rare record. The caption 1101 includes a text "will you see a miracle?" and a text indicating that a predicted score in a case of a home run is 98 (in this example, 100 is the maximum value, so 98 is an extremely high score). Since such a caption 1101 is displayed, the user can recognize a degree of amazingness of the play that may be made. Therefore, for example, it is possible to appropriately determine whether or not to continue viewing the video.

Figure 7:
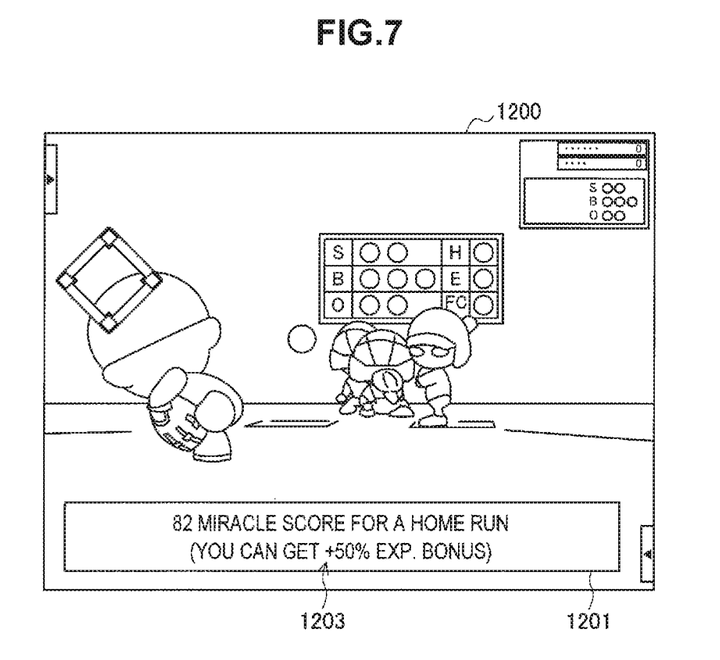
FIG. 7 is a diagram illustrating an example in which a calculated score is applied to a caption or a system of a video game according to an embodiment of the present disclosure.

FIG. 7 is a diagram illustrating an example in which a calculated score is applied to a caption or a system of a video game according to an embodiment of the present disclosure. In the illustrated example, a caption 1201 is displayed in a video 1200 of a video game. In the illustrated example, the score calculated by the score calculation unit 503 is also referred to as a "miracle score". The caption 1201 includes a text indicating that a miracle score in a case of a home run is 82 (also in this example, 100 is the maximum value, so 82 is a very high score), and a text 1203 indicating that the user can get an experience point addition bonus of 50% in this video game if the home run is scored. As described above, a score to be calculated according to the embodiment may be calculated with regard to action that is taken in a virtual space, or a status in the virtual space may vary in accordance with the calculated score.

The embodiments of the present disclosure have been described above. In the above described embodiments, the action is a play or performance in sports. However, the action according to the embodiments of the present disclosure is not limited thereto. For example, the score calculated according to the embodiments of the present disclosure is useful for any action that may be a target of evaluation or appreciation, in addition to the action in the sports. In addition, for example, a score of music or performance such as a dance may be calculated in a similar way, and the score may be used for generating a highlight video.

(6. Hardware Configuration)

Figure 8:
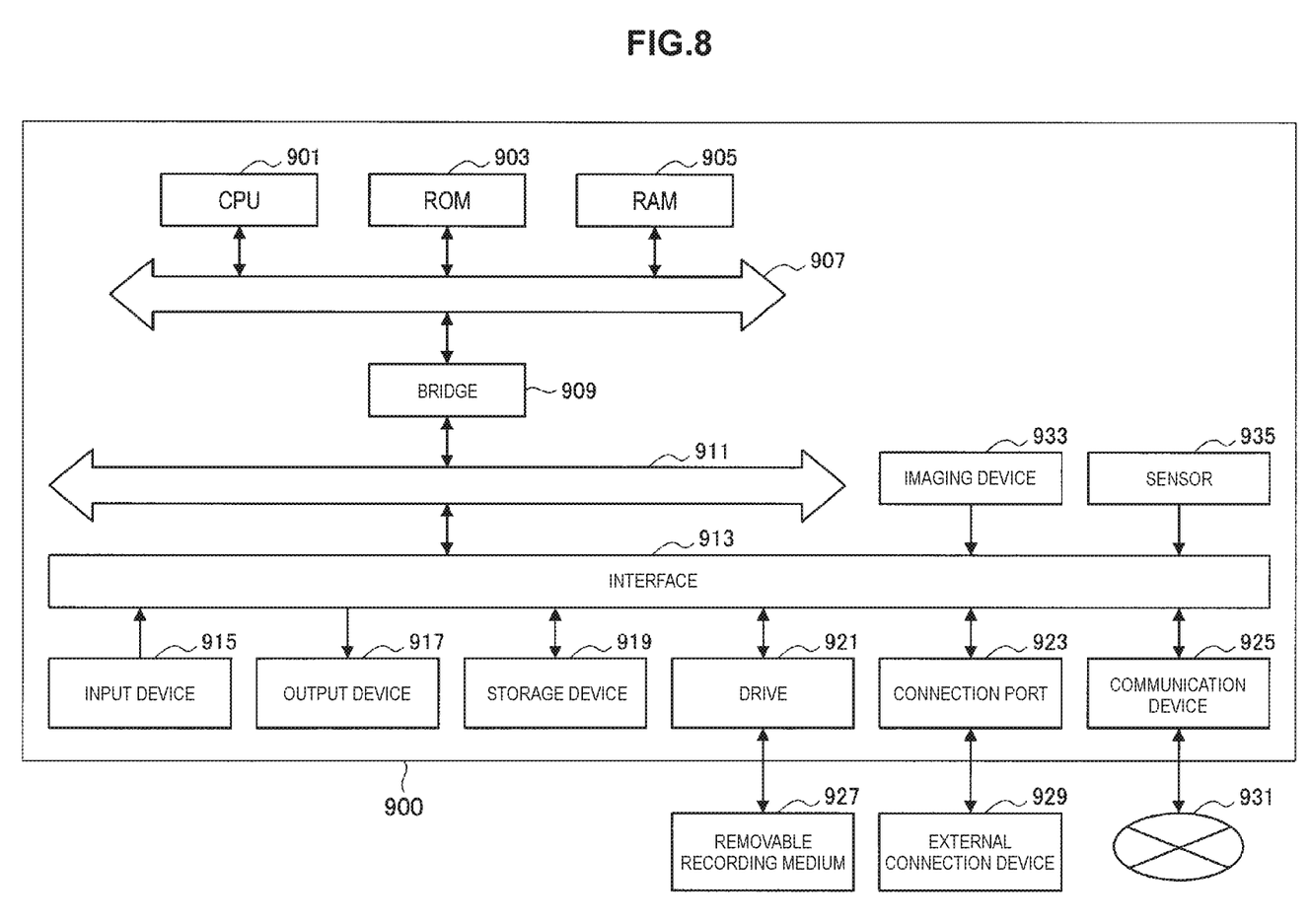
FIG. 8 is a block diagram illustrating a hardware configuration example of an information processing device according to an embodiment of the present disclosure.

Next, with reference to FIG. 8, a hardware configuration of an information processing device according to an embodiment of the present disclosure will be described. FIG. 8 is a block diagram illustrating a hardware configuration example of an information processing device according to the embodiments of the present disclosure. The illustrated information processing device 900 may implement the server, television, recorder, or camera according to the above described embodiments, for example.

The information processing device 900 includes a central processing unit (CPU) 901, a read only memory (ROM) 903, and a random access memory (RAM) 905. In addition, the information processing device 900 may include a host bus 907, a bridge 909, an external bus 911, an interface 913, an input device 915, an output device 917, a storage device 919, a drive 921, a connection port 923, and a communication device 925. Moreover, the information processing device 900 may include an imaging device 933, and a sensor 935, as necessary. The information processing device 900 may include a processing circuit such as a digital signal processor (DSP), an application-specific integrated circuit (ASIC), or a field-programmable gate array (FPGA), alternatively or in addition to the CPU 901.

The CPU 901 functions as an arithmetic processing device and a control device, and controls the overall operation or a part of the operation of the information processing device 900 in accordance with various programs recorded in the ROM 903, the RAM 905, the storage device 919, or a removable recording medium 927. The ROM 903 stores programs, operation parameters, and the like used by the CPU 901. The RAM 905 transiently stores programs used when the CPU 901 is executed, and various parameters that change as appropriate when executing such programs. The CPU 901, the ROM 903, and the RAM 905 are connected with each other via the host bus 907 including an internal bus such as a CPU bus or the like. The host bus 907 is connected to the external bus 911 such as a Peripheral Component Interconnect/Interface (PCI) bus via the bridge 909.

The input device 915 is a device operated by a user such as a mouse, a keyboard, a touch panel, a button, a switch, and a lever. The input device 915 may be a remote control device that uses, for example, infrared radiation and another type of radio waves. Alternatively, the input device 915 may be an external connection device 929 such as a mobile phone that corresponds to an operation of the information processing device 900. The input device 915 includes an input control circuit that generates input signals on the basis of information which is input by a user to output the generated input signals to the CPU 901. The user inputs various types of data and indicates a processing operation to the information processing device 900 by operating the input device 915.

The output device 917 includes a device that can report acquired information to a user visually, audibly, or haptically. The output device 917 may be, for example, a display device such as a liquid crystal display (LCD) or an organic electro-luminescence (EL) display, an audio output device such as a speaker or a headphone, or a vibrator. The output device 917 outputs a result obtained through a process performed by the information processing device 900, in the form of video such as text and an image, sounds such as voice and audio sounds, or vibration.

The storage device 919 is a device for storing data that is an example of a storage unit of the information processing device 900. The storage device 919 is implemented by, for example, a magnetic storage device such as a hard disk drive (HDD), a semiconductor storage device, an optical storage device, or a magneto-optical storage device. The storage device 919 stores therein the programs and various types of data executed by the CPU 901, and various types of data acquired from an outside.

The drive 921 is a reader/writer for the removable recording medium 927 such as a magnetic disk, an optical disc, a magneto-optical disk, or a semiconductor memory, and built in or externally attached to the information processing device 900. The drive 921 reads out information recorded on the mounted removable recording medium 927, and outputs the information into the RAM 905. The drive 921 writes the record into the mounted removable recording medium 927.

The connection port 923 is a port used to connect devices to the information processing device 900. The connection port 923 may be a USB (Universal Serial Bus) port, an IEEE1394 port, or a SCSI (Small Computer System Interface) port. Alternatively, the connection port 923 may be an RS-232C port, an optical audio terminal, an HDMI (registered trademark) (High-Definition Multimedia Interface) port, or the like. By connecting the external connection device 929 with the connection port 923, it is possible to exchange various kinds of data between the information processing device 900 and the external connection device 929.

The communication device 925 is a communication interface implemented by, for example, a communication device for connection to a communication network 931. The communication device 925 may be, for example, a communication card for a local area network (LAN), Bluetooth (registered trademark), Wi-Fi, or a wireless USB (WUSB). The communication device 925 may also be, for example, a router for optical communication, a router for asymmetric digital subscriber line (ADSL), or a modem for various types of communication. For example, the communication device 925 transmits and receives signals in the Internet or transmits and receives signals to and from another communication device by using a predetermined protocol such as TCP/IP. The communication network 931 with which the communication device 925 is connected is a network established through wired or wireless connection. The communication network 931 may include, for example, the Internet, a home LAN, infrared communication, radio communication, or satellite communication.

The imaging device 933 is a device that captures an image of a real space by using an image sensor such as a charge coupled device (CCD) or a complementary metal oxide semiconductor (CMOS), and various members such as a lens for controlling image formation of a subject image onto the image sensor, and generates the captured image. The imaging device 933 may capture a still image or a moving image.

The sensor 935 is various sensors such as an acceleration sensor, an angular velocity sensor, a geomagnetic sensor, an illuminance sensor, a temperature sensor, a barometric sensor, and a sound sensor (microphone). The sensor 935 acquires information regarding a state of the information processing device 900 such as a posture of a housing of the information processing device 900, and information regarding an environment surrounding the information processing device 900 such as luminous intensity and noise around the information processing device 900. The sensor 935 may include a global positioning system (GPS) receiver that receives GPS signals to measure latitude, longitude, and altitude of the device.

The example of the hardware configuration of the information processing device 900 has been described above. Each of the structural elements described above may be implemented by a general purpose component or may be implemented by hardware specialized for the function of each of the structural elements. The configuration may be changed as necessary in accordance with the state of the art at the time of working of the present disclosure.

(7. Supplement)

The embodiments of the present disclosure may include, for example, the above-described information processing device (server, television, recorder, or camera), a system, an information processing method executed by the information processing device or the system, a program for causing the information processing device to exhibits its function, and a non-transitory physical medium having the program stored therein.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing device including:

a variate acquisition unit configured to acquire a first variate related to a content of action, and a second variate related to context in which the action is taken; and a score calculation unit configured to calculate a score for evaluating the action on a basis of the first variate and the second variate.

(2)

The information processing device according to (1), wherein the variate acquisition unit acquires the first variate related to a content of the action that is not finished, for each of development patterns of the action that are predicted at the time, and the score calculation unit calculates the score for each of the development patterns.

(3)

The information processing device according to (2), wherein the score calculation unit calculates an expected value of the score on a basis of probability of occurrence of each of the development patterns.

(4)

The information processing device according to (2), wherein, among the scores calculated for the development patterns having reasonable probability of occurrence, the score calculation unit adopts a highest score as a predicted value of the scores.

(5)

The information processing device according to any one of (1) to (4), further including a coefficient acquisition unit configured to acquire a coefficient calculated on a basis of relation among the first variate and the second variate related to past action, and responses to the past action from an audience, wherein the score calculation unit calculates the score on a basis of the coefficient.

(6)

The information processing device according to (5), wherein the coefficient is calculated in accordance with a degree of stimulation of media with regard to the past action.

(7)

The information processing device according to any one of (1) to (6), wherein the score calculation unit calculates the scores by attribute of actors who have taken the action.

(8)

The information processing device according to any one of (1) to (7), wherein the score calculation unit calculates the scores by attribute of users of content related to the action.

(9)

The information processing device according to any one of (1) to (8), wherein the action includes a plurality of types of sports, and the score calculation unit calculates a score common to the respective types of sports.

(10)

The information processing device according to (9), wherein the score calculation unit corrects the score in accordance with popularity of each type of sports.

(11)

The information processing device according to (10), wherein the score calculation unit adjusts the score upward with regard to a sport with low popularity.

(12)

The information processing device according to any one of (1) to (11), wherein the second variate includes a variate related to an actor who has taken the action.

(13)

The information processing device according to any one of (1) to (12), wherein the action is taken during a match, and the second variate includes a variate related to progress of the match until the action is taken.

(14)

The information processing device according to any one of (1) to (13), wherein the action is taken during a match, and the second variate includes a variate related to a result of the match, which is derived by taking the action.

(15)

An information processing method including:

acquiring a first variate related to a content of action, and a second variate related to context in which the action is taken; and calculating, by a processor, a score for evaluating the action on a basis of the first variate and the second variate.

(16)

A program for causing a computer to achieve:

a function of acquiring a first variate related to a content of action, and a second variate related to context in which the action is taken; and a function of calculating a score for evaluating the action on a basis of the first variate and the second variate.

REFERENCE SIGNS LIST

10 system
100 television
150 recorder
200 server
300 camera
500 score calculation process
501 variate acquisition unit
503 score calculation unit
505 score output unit
507 coefficient acquisition unit
509 coefficient DB
511 coefficient calculation unit

The invention claimed is:

1. An information processing device, comprising:
at least one processor configured to:
acquire a first variate related to first content of an action in a video, wherein the action corresponds to a plurality of sport types of a plurality of sports;
acquire a second variate related to context in which the action is taken in the video;
determine a coefficient for calculation of a first score of a plurality of scores,
wherein the coefficient is determined based on an audience response to the action;
calculate the first score based on the first variate, the second variate, the determined coefficient, and an attribute of an actor who has taken the action;
evaluate the action based on the calculated first score;
calculate a second score of the plurality of sport types, wherein the second score is common to the plurality of sport types;
adjust the second score based on a sport type of the plurality of sport types with a lowest popularity among the plurality of sport types;
control a display device to display the calculated first score and the adjusted second score;
extract a plurality of parts from the video based on the calculated first score that exceeds a threshold value, wherein the calculated first score exceeds the threshold value for each part of the plurality of parts;
generate a highlight video based on the extracted plurality of parts; and
control the display device to display the generated highlight video.

2. The information processing device according to claim 1, wherein the at least one processor is further configured to:
acquire the first variate related to second content of the action that is unfinished, for each development pattern of a plurality of development patterns of the action that are predicted at a same time; and
calculate the plurality of scores for the plurality of development patterns, wherein each development pattern of the plurality of development patterns corresponds to a respective score of the plurality of scores.

3. The information processing device according to claim 2, wherein the at least one processor is further configured to calculate an expected value of the first score based on a probability of occurrence of each development pattern of the plurality of development patterns.

4. The information processing device according to claim 2, wherein
among the plurality of scores calculated for the plurality of development patterns having a threshold probability of occurrence, the at least one processor is further configured to adopt a highest score as a predicted value of the plurality of scores.

5. The information processing device according to claim 1, wherein the coefficient is further calculated based on:
a relation between the first variate and the second variate, wherein the second variate is related to a past action, and
responses to the past action from an audience.

6. The information processing device according to claim 5, wherein the coefficient is calculated based on a degree of stimulation of media with regard to the past action.

7. The information processing device according to claim 1, wherein the at least one processor is further configured to calculate the plurality of scores based on an attribute of a plurality of actors who have taken the action.

8. The information processing device according to claim 1, wherein the at least one processor is further configured to calculate the plurality of scores based on user attributes of the first content related to the action.

9. The information processing device according to claim 1, wherein the second variate includes a variate related to the actor who has taken the action.

10. The information processing device according to claim 1, wherein
the action is taken in a match, and
the second variate includes a variate related to a progress of the match until the action is taken.

11. The information processing device according to claim 1, wherein
the action is taken in a match, and
the second variate includes a variate related to a result of the match, which is derived based on the action.

12. An information processing method, comprising:
acquiring, by a processor, a first variate related to content of an action in a video, wherein the action corresponds to a plurality of sport types of a plurality of sports;
acquiring, by the processor, a second variate related to context in which the action is taken in the video;
determining, by the processor, a coefficient for calculation of a first score of a plurality of scores,
wherein the coefficient is determined based on an audience response to the action;
calculating, by the processor, the first score based on the first variate, the second variate, the determined coefficient, and an attribute of an actor who has taken the action;
evaluating, by the processor, the action based on the calculated first score;
calculating, by the processor, a second score of the plurality of sport types, wherein the second score is common to the plurality of sport types;
adjusting, by the processor, the second score based on a sport type of the plurality of sport types with a lowest popularity among the plurality of sport types;
controlling, by the processor, a display device to display the calculated first score and the adjusted second score;
extracting, by the processor, a plurality of parts from the video based on the calculated first score that exceeds a threshold value, wherein the calculated first score exceeds the threshold value for each part of the plurality of parts;
generating, by the processor, a highlight video based on the extracted plurality of parts; and
controlling, by the processor, the display device to display the generated highlight video.

13. A non-transitory computer-readable medium having stored thereon computer-executable instructions, which when executed by a computer, causes the computer to execute operations, the operations comprising:
acquiring a first variate related to content of an action in a video, wherein the action corresponds to a plurality of sport types of a plurality of sports;
acquiring a second variate related to context in which the action is taken in the video;
determining a coefficient for calculation of a first score of a plurality of scores,
wherein the coefficient is determined based on an audience response to the action;
calculating the first score based on the first variate, the second variate, the determined coefficient, and an attribute of an actor who has taken the action;
evaluating the action based on the calculated first score;

calculating a second score of the plurality of sport types, wherein the second score is common to the plurality of sport types;

adjusting the second score based on a sport type of the plurality of sport types with a lowest popularity among the plurality of sport types;

controlling a display device to display the calculated first score and the adjusted second score;

extracting a plurality of parts from the video based on the calculated first score that exceeds a threshold value, wherein the calculated first score exceeds the threshold value for each part of the plurality of parts;

generating a highlight video based on the extracted plurality of parts; and controlling the display device to display the generated highlight video.

* * * * *